United States Patent
Teh et al.

(10) Patent No.: US 12,283,890 B2
(45) Date of Patent: Apr. 22, 2025

(54) DCDC CIRCUIT

(71) Applicants: Kabushiki Kaisha Toshiba, Tokyo (JP); Toshiba Electronic Devices & Storage Corporation, Tokyo (JP)

(72) Inventors: Chen kong Teh, Ota Tokyo (JP); Te Bi, Koto Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 265 days.

(21) Appl. No.: 18/105,131

(22) Filed: Feb. 2, 2023

(65) Prior Publication Data

US 2023/0387804 A1    Nov. 30, 2023

(30) Foreign Application Priority Data

May 27, 2022    (JP) .................. 2022-086837

(51) Int. Cl.
*H02M 3/158* (2006.01)
*H02M 1/00* (2006.01)
*H02M 1/14* (2006.01)

(52) U.S. Cl.
CPC ....... *H02M 3/1584* (2013.01); *H02M 1/0064* (2021.05); *H02M 1/143* (2013.01)

(58) Field of Classification Search
CPC .......... H02M 3/07; H02M 3/073; H02M 7/10; H02M 7/103; H02M 7/106; H02M 1/088; H02M 2003/071; H02M 2003/072; H02M 2003/075; H02M 2003/076; H02M 2003/077; H02M 2003/078; H02M 2001/007; H02M 2001/0048; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346;
(Continued)

(56) References Cited

U.S. PATENT DOCUMENTS 11,637,491 B2 *   4/2023   Petersen .................. H02M 3/07
                                                                        323/271
11,817,770 B2 *  11/2023   Liu ........................ H02M 3/07
(Continued)

FOREIGN PATENT DOCUMENTS

| JP | 2008-141871 A | 6/2008 |
| JP | 5059160 B2 | 10/2012 |
| JP | 2019-129679 A | 8/2019 |

*Primary Examiner* — Jeffrey A Gblende
(74) *Attorney, Agent, or Firm* — Kim & Stewart LLP

(57) ABSTRACT

A DCDC circuit according to an embodiment includes a capacitor network, and a smoothing capacitor. The capacitor network includes a first state in which first capacitors are connected onto a wiring path between an input node to which an input voltage is applied and one end of a first coil and a second capacitor is connected between a connection point of the first capacitors on the wiring path and a reference potential point, and a second state in which the second capacitor is connected to one end of a second coil and the first capacitors are connected between one end of the second capacitor and the reference potential point and between the other end of the second capacitor and the reference potential point, respectively.

12 Claims, 11 Drawing Sheets

(58) Field of Classification Search
CPC ....... H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/0048; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H05B 39/048; B23K 11/24; H04B 2215/069

See application file for complete search history.

(56) References Cited

U.S. PATENT DOCUMENTS

| | | |
|---|---|---|
| 2008/0211316 A1 | 9/2008 | Watanabe et al. |
| 2023/0179094 A1* | 6/2023 | Jin ...................... H02M 1/0095 323/271 |
| 2024/0266957 A1* | 8/2024 | Kim ...................... H02M 3/158 |

* cited by examiner

DCDC CIRCUIT

CROSS-REFERENCE TO RELATED APPLICATION

This application is based upon and claims the benefit of priority from the prior Japanese Patent Application No. 2022-086837 filed in Japan on May 27, 2022; the entire contents of which are incorporated herein by reference.

FIELD

Embodiments described herein relate generally to a DCDC circuit.

BACKGROUND

Conventionally, step-down circuits using coils, capacitors and switches have been known as DCDC circuits. Such DCDC circuits obtain a desired output voltage by changing a duty ratio of input voltages applied to the coils by switching operation of the switches.

However, when an output voltage is lowered relatively greatly with respect to an input voltage, for example, when a relationship between an output voltage Vout and an input voltage Vin is set to Vout<0.1×Vin, there is a disadvantage that switching on-time becomes extremely short, switching loss increases and conversion efficiency degrades.

A method of improving conversion efficiency by lowering an input voltage using a transformer and then applying the input voltage to coils can be considered. However, in this case, since the transformer is required, there is a disadvantage that the volume of the DCDC circuit increases.

DETAILED DESCRIPTION

A DCDC circuit according to an embodiment includes a capacitor network including two or more first capacitors, at least one second capacitor, and a plurality of switches, a first coil having one end connected to the capacitor network, a second coil having one end connected to the capacitor network, and a smoothing capacitor connected between each of the other end of the first coil and the other end of the second coil and a reference potential point, in which through the plurality of switches, the capacitor network includes a first state in which the two or more first capacitors are connected onto a wiring path between an input node to which an input voltage is applied and the one end of the first coil and the at least one second capacitor is connected between a connection point of the two or more first capacitors on the wiring path and the reference potential point, and a second state in which the at least one second capacitor is connected to the one end of the second coil and the two or more first capacitors are connected between one end of the at least one second capacitor and the reference potential point and between the other end of the at least one second capacitor and the reference potential point, respectively.

Hereinafter, embodiments of the invention will be described in detail with reference to the accompanying drawings.

First Embodiment

Figure 1:
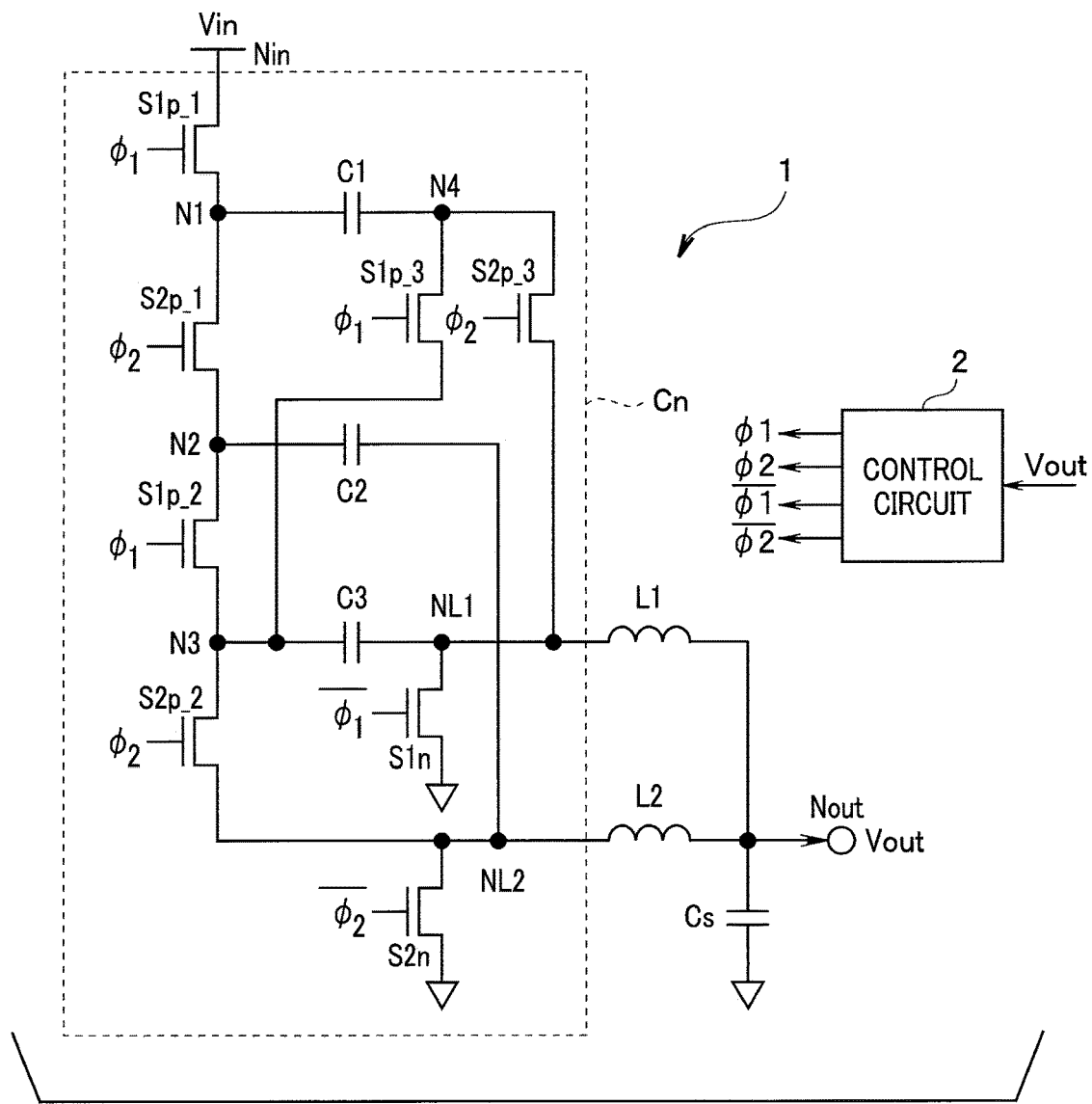
FIG. 1 is a circuit diagram illustrating a DCDC circuit according to a first embodiment of the invention.

FIG. 1 is a circuit diagram illustrating a DCDC circuit according to a first embodiment of the invention. The embodiment is intended to improve conversion efficiency using a switched capacitor circuit with a plurality of capacitors.

As shown in FIG. 1, a DCDC circuit 1 includes a capacitor network Cn including three capacitors C1, C2 and C3, two coils L1 and L2, and a capacitor Cs that constitutes a smoothing circuit together with the coils L1 and L2. The capacitor network Cn includes switches S1$p$_1, S1$p$_2 and S1$p$_3 (hereinafter referred to as a "switch S1$p$," when these switches are not distinguished from each other) to change connection relationships among the capacitors C1 to C3 and the coils L1 and L2, and switches S2$p$_1, S2$p$_2 and S2$p$_3 (hereinafter referred to as a "switch S2$p$," when these switches are not distinguished from each other) and switches S1$n$ and S2$n$. Hereinafter, the S1$p$, S2$p$, S1$n$ and S2$n$ are collectively called "switch S."

The switch S1$p$_turns on/off based on a control signal $\varphi1$ and the switch S2$p$ turns on/off based on a control signal $\varphi2$. On the other hand, the switch S1$n$ turns on/off based on a control signal $/\varphi1$, which is inverted from the control signal $\varphi1$ and the switch S2$n$ turns on/off based on a control signal $/\varphi2$ which is inverted from the control signal $\varphi2$. Note that various switches such as an NMOS transistor, a PMOS transistor or a GaN (nitride gallium) transistor can be adopted as the switch S.

The DCDC circuit 1 is controlled by a control circuit 2. The control circuit 2 may be constructed of a processor using a CPU (central processing unit), an FPGA (field programmable gate array) or the like. The control circuit 2 may operate according to a program stored in a memory (not shown) and control each section or may implement some or all of functions by a hardware electronic circuit. The control circuit 2 generates control signals $\varphi1$, $\varphi2$, $/\varphi1$ and $/\varphi2$ (hereinafter these signals are representatively referred to as "control signal $\varphi$"), supplies the generated control signal $\varphi$ to each switch S and controls on/off of each switch S. An output voltage Vout is inputted to the control circuit 2. The control circuit 2 adjusts a duty ratio of the control signal $\varphi$ so that the output voltage Vout becomes a desired voltage.

(Configuration of Capacitor Network Cn)

The switches S1$p$_1, S2$p$_1, S1$p$_2 and S2$p$_2 are connected in series between a node to which an input voltage Vin is supplied (hereinafter referred to as a "node Nin") and a node connected to one end of the coil L2 (hereinafter referred to as a "node NL2"). A connection point of the switch S1$p$_1 and the switch S2$p$_1 is called "node N1," a connection point of the switch S2$p$_1 and the switch S1$p$_2 is called "node N2," and a connection point of the switch S1$p$_2 and the switch S2$p$_2 is called "node N3."

The node N1 is connected to a node connected to one end of the coil L1 via the capacitor C1 and the switch S2$p$_3 (hereinafter referred to as a "node NL1"). The node NL1 is connected to a reference potential point via the switch S1$n$. A connection point of the capacitor C1 and the switch S2$p$_3 (hereinafter referred to as a "node N4") is connected to the node N3 via the switch S1$p$_3 and the node N3 is connected to the node NL1 via the capacitor C3.

The node N2 is connected to the node NL2 via the capacitor C2 and the node NL2 is connected to the reference potential point via the switch S2$n$.

The other end of the coil L1 and the other end of the coil L2 are commonly connected, connected to a node that outputs the output voltage Vout (hereinafter referred to as a "node Nout") and connected to the reference potential point via the capacitor Cs.

(Connection State in Each Step)

Figure 2:
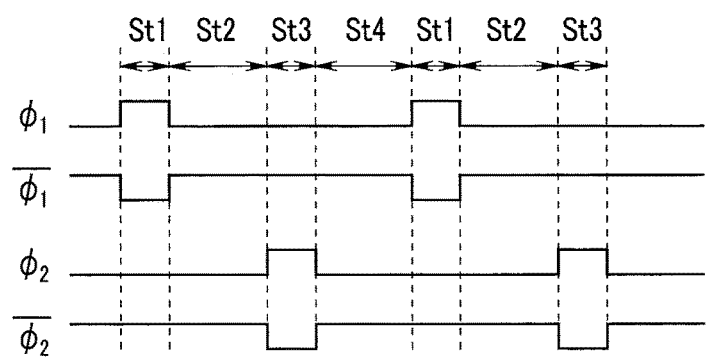
FIG. 2 is a timing chart to describe control signals $\varphi1$, $\varphi2$, $/\varphi1$ and $/\varphi2$.

FIG. 2 is a timing chart to describe the control signals φ1, φ2, /φ1 and /φ2.

Note that in the following descriptions, it is assumed that the switch S1$p$_turns on at high level (hereinafter referred to as "H level") of the control signal φ1 and turns off at low level (hereinafter referred to as "L level"). It is assumed that the switch S2$p$_turns on at H level of the control signal φ2 and turns off at L level. It is assumed that the switch S1$n$ turns on at H level of the control signal /φ1 and turns off at L level. It is assumed that the switch S2$n$ turns on at H level of the control signal /φ2 and turns off at L level.

In the embodiment, the control circuit 2 sets four steps (Step 1 to Step 4) by the control signal φ. St1 to St4 in FIG. 2 represent periods of Step 1 to Step 4, respectively. The control signal φ1 is at H level in the period St1 and at L level in the other periods. The control signal /φ1 is at L level in the period St1 and at H level in the other periods. The control signal φ2 is at H level in the period St3 and at L level in the other periods. The control signal /φ2 is at L level in the period St3 and at H level in the other periods. Note that the period St1 of Step 1 and the period St3 of Step 3 are out of phase by 180 degrees, and similarly, the period St2 of Step 2 and the period St4 of Step 4 are out of phase by 180 degrees.

Therefore, in the period St1 of Step 1, the switches S1$p$ and S2$n$ are on and the switches S2$p$_and S1$n$ are off. In the period St2 of Step 2, the switches S1$n$ and S2$n$ are on and the switches S1$p$ and S2$p$_are off. In the period St3 of Step 3, the switches S2$p$_and S1$n$ are on and the switches S1$p$ and S2$n$ are off. In the period St4 of Step 4, the switches S1$n$ and S2$n$ are on and the switches S1$p$ and S2$p$_are off.

Figure 3:
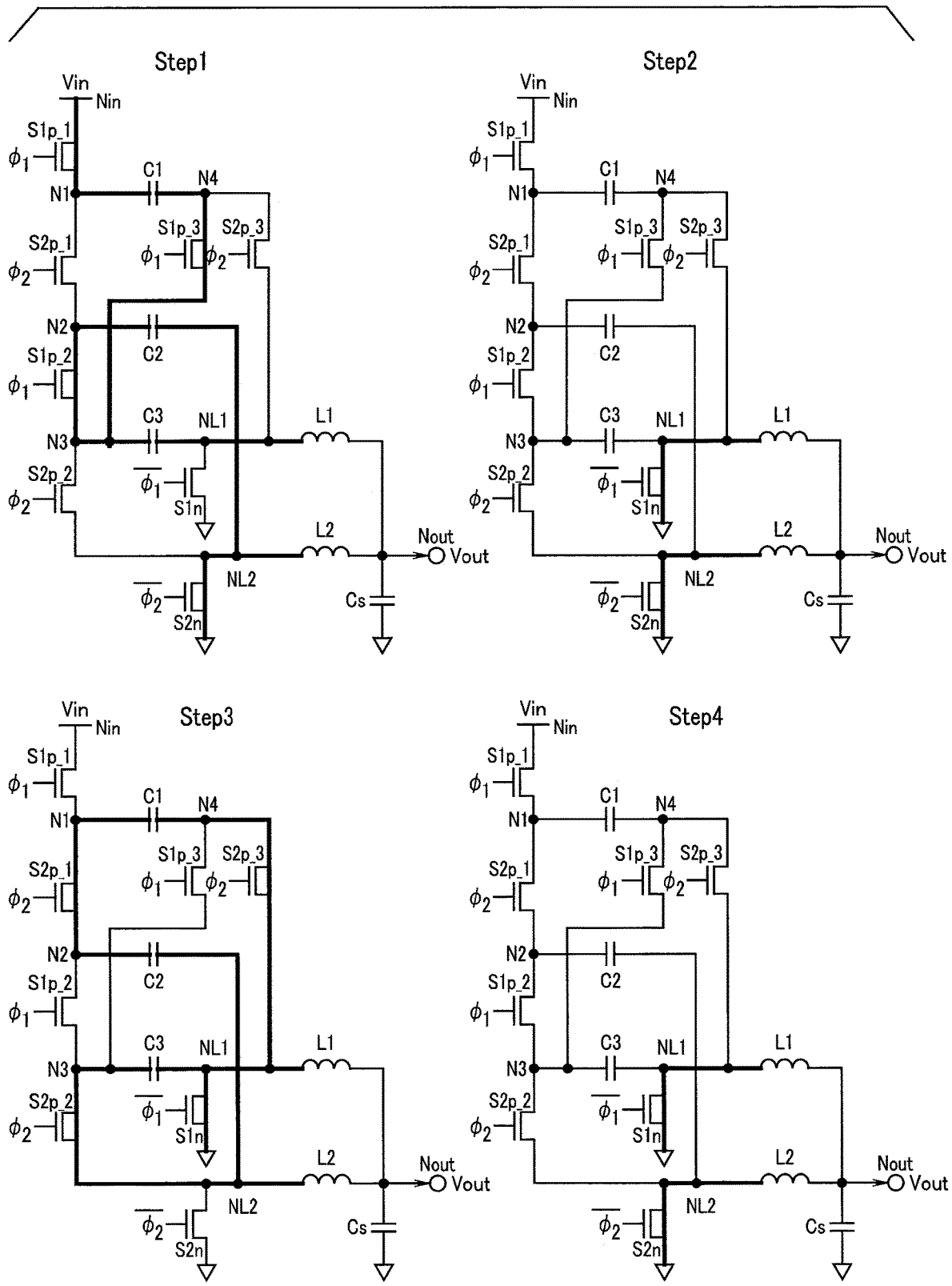
FIG. 3 is an explanatory diagram to illustrate connection relationships of a capacitor network Cn in Step 1 to Step 4.

FIG. 3 is an explanatory diagram to illustrate connection relationships of the capacitor network Cn in Step 1 to Step 4. Thick lines in FIG. 3 show which switch S is in a connection state.

As shown in an upper left column of FIG. 3, in Step 1, the switches S1$p$ and S2$n$ turn on and connections shown by thick lines are made. As shown in an upper right column of FIG. 3, in Step 2, the switches S1$n$ and S2$n$ turn on and connections shown by thick lines are made. As shown in a lower left column of FIG. 3, in Step 3, the switches S2$p$_and S1$n$ turn on and connections shown by thick lines are made. As shown in a lower right column of FIG. 3, in Step 4, the switches S1$n$ and S2$n$ turn on and connections shown by thick lines are made.

Figure 4:
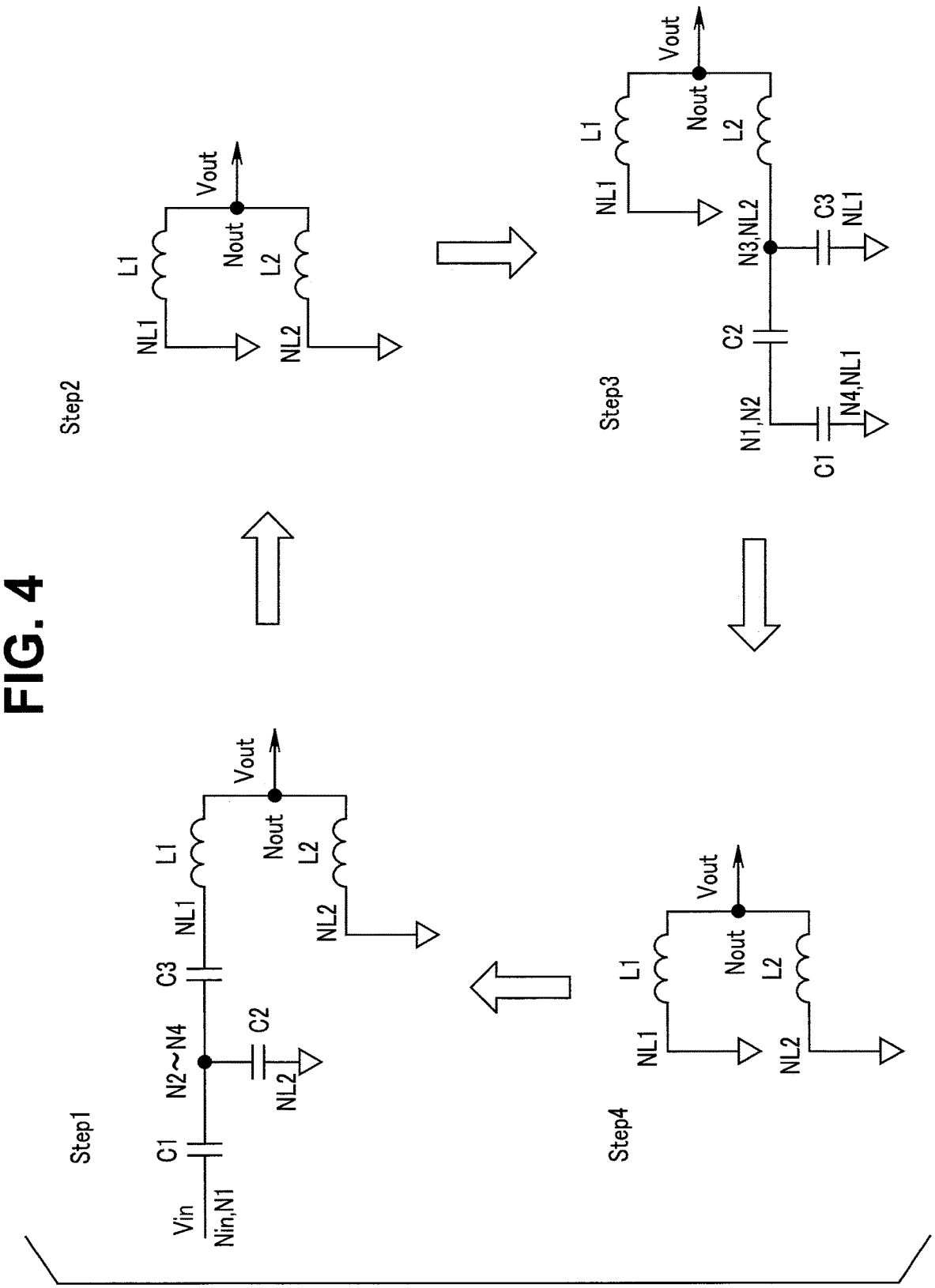
FIG. 4 is an explanatory diagram to describe connection relationships among capacitors C1 to C3 of the capacitor network Cn and coils L1 and L2 in Step 1 to Step 4, with a switch S omitted.

FIG. 4 is an explanatory diagram to describe connection relationships among capacitors C1 to C3 of the capacitor network Cn and the coils L1 and L2 in Step 1 to Step 4, with the switch S omitted.

In Step 1, as shown in an upper left column of FIG. 4, the node Nin is connected to the nodes N2 to N4 via the capacitor C1, and is further connected to one end (node NL1) of the coil L1 via the capacitor C3. In other words, of the capacitor network Cn, the capacitors C1 and C3 with odd numbers are connected in series between the node Nin and the node NL1. The capacitor C2 with an even number is connected between the nodes N2 to N4, mutual connection points of the capacitors C1 and C3, and a reference potential point. Note that the node NL2 connected to the coil L2 is connected to the reference potential point.

In Step 2, as shown in an upper right column of FIG. 4, the node NL1 connected to one end of the coil L1 and the node NL2 connected to one end of the coil L2 are both connected to the reference potential points.

In Step 3, as shown in a lower right column of FIG. 4, the node N1 or N2 is connected to one end of the coil L2 via the capacitor C2, and via the node N3 or NL2. In other words, of the capacitor network Cn, the capacitor C2 with an even number is connected in series between the node N1 or N2 and the node NL2. The capacitor C1 with an odd number is connected between the node N1 or N2 and the reference potential point, and the capacitor C3 with an odd number is connected between the node N3 or NL2 and the reference potential point. Note that the node NL1 connected to the coil L1 is connected to the reference potential point.

In Step 4, as shown in a lower left column of FIG. 4, the node NL1 connected to one end of the coil L1 and the node NL2 connected to one end of the coil L2 are both connected to the reference potential points.

(Operation)

Figure 5:
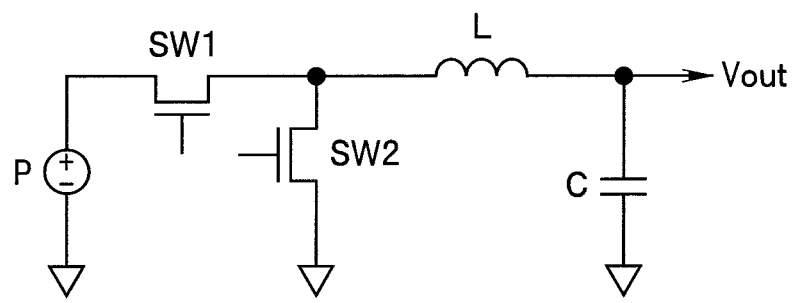
FIG. 5 is a circuit diagram illustrating a comparative example.
Figure 6:
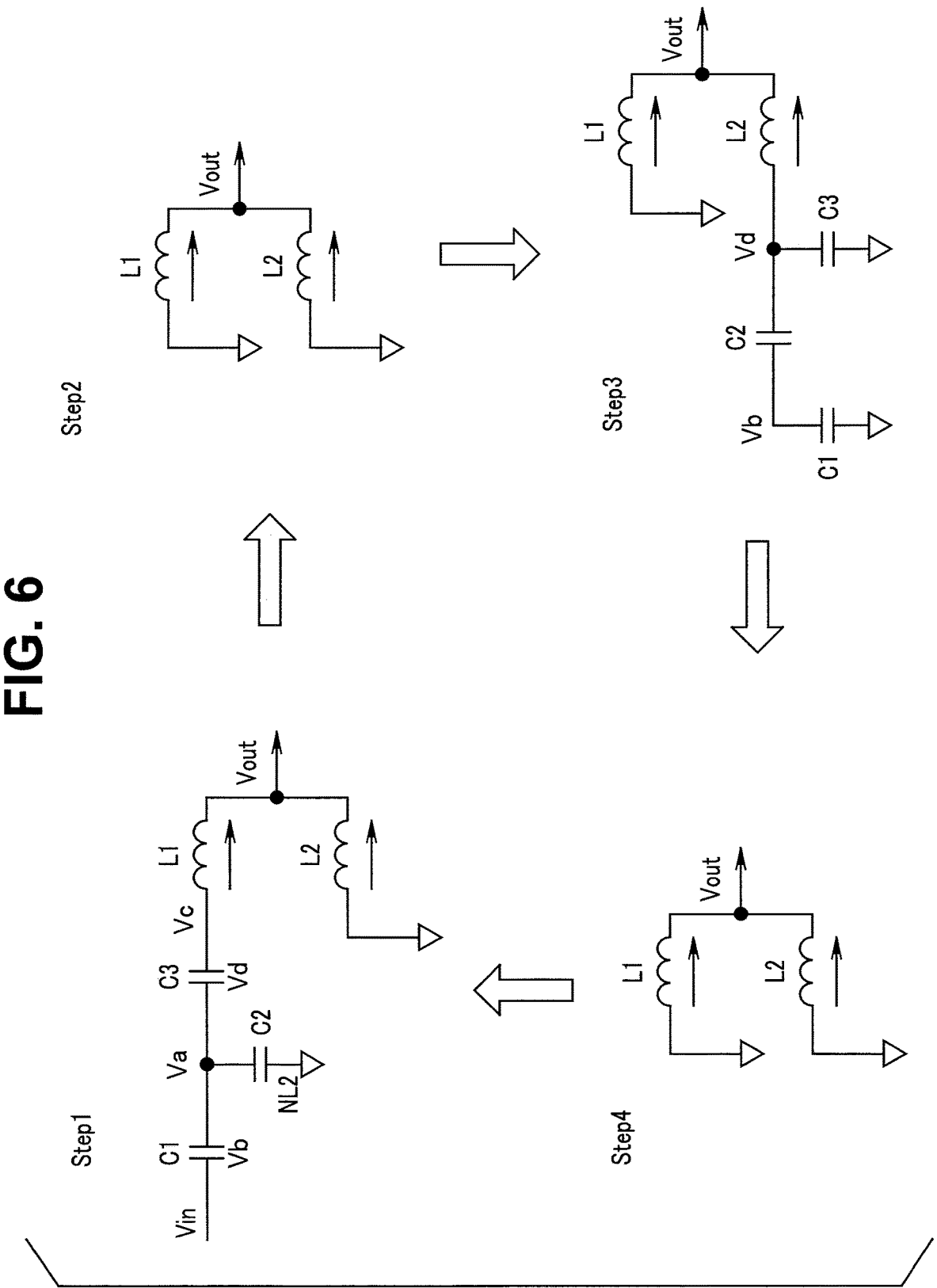
FIG. 6 is an explanatory diagram to describe outputs and effects of the embodiment.

Next, operation of the embodiment configured in this way will be described with reference to FIG. 5 and FIG. 6. FIG. 5 is a circuit diagram illustrating a comparative example and FIG. 6 is an explanatory diagram to describe outputs and effects of the embodiment. Note that arrows in FIG. 6 indicate current directions.

The comparative example in FIG. 5 shows a general DCDC circuit. In the DCDC circuit in the comparative example, a switch SW1 is provided between a power supply P and one end of a coil L, and the one end of the coil L is connected to a reference potential point via a switch SW2. The other end of the coil L is connected to the reference potential point via a capacitor C. An output voltage Vout is obtained from the other end of the coil L.

The switches SW1 and SW2 turn on/off alternately. A voltage Vin generated at the power supply P is intermittently applied to the coil L by the switch SW1. During an on-period of the SW1, a current flows from the power supply P to an output end via the switch SW1 and the coil L. During this period, energy is accumulated in the coil L. During an off-period of the SW1, a current flows from the reference potential point to the output end via the coil L by a back electromotive force of the coil L. The coil L and the capacitor C smoothen the input voltage Vin and the output voltage Vout is obtained.

When it is assumed that the ratio of the on-period in a switching cycle of the switch SW1 (duty ratio) is Dutya, Vout=Vin×Dutya holds. In other words, Dutya=Vout/Vin.

In Step 1 shown in an upper left column of FIG. 6, the input voltage Vin from the node Nin causes a current to flow through the coil L1 from the node Nin via the capacitor network Cn. Thus, energy is accumulated in the coil L1. In Step 2, one end of the coil L1 or the coil L2 is connected to a reference potential point. In Step 2, a back electromotive force generated at the coil L1 or L2 causes a current to flow from the reference potential point to the node Nout via the coil L1 or L2.

In Step 3, the capacitor network Cn is connected to the coil L2 and a charging voltage of the capacitor network Cn causes a current to flow through the coil L2. In this way, energy is accumulated in the coil L2. In Step 4, one end of the coil L1 or the coil L2 is connected to the reference potential point. In this case, a back electromotive force generated at the coil L1 or L2 causes a current to flow from the reference potential point to the node Nout via the coil L1 or L2.

The control circuit 2 generates the control signals φ1, φ2, /φ1 and/φ2, controls each switch S and thereby cyclically repeats Step 1, Step 2, Step 3, Step 4, Step 1, . . . . In this way, the output voltage Vout corresponding to the input voltage Vin and the cycle of the switch S is obtained from the node Nout.

In a steady state, it is assumed that a voltage at the connection point (node N2 to N4) between the capacitor C1 and the capacitor C3 is Va and a voltage at one end of the coil L1 is Vc. It is assumed that a terminal voltage at the capacitor C1 is Vb and a terminal voltage of the capacitor C3 is Vd. In Step 1, the input voltage Vin is given to the node Nin and each capacitor C1, C2 or C3 of the capacitor network Cn is charged. In Step 3, the charging voltage of the capacitor C1 to C3 causes a current to flow through the coils L1 and L2. According to the law of conservation of charge, the following equations (1) to (3) hold for the capacitors C1 to C3.

$$Vin - Va = Vb \quad (1)$$

$$Va = Vb - Vd \quad (2)$$

$$Va - Vc = Vd \quad (3)$$

When it is assumed that the cycle of Step 1 to Step 4 is 1, and the period of Step 1, that is, the period during which the input voltage Vin causes a current to flow through the coils L1 and L2 is Duty, according to the law of conservation of a magnetic flux change rate (volt-second-balance-principle), the following equation (4) holds for the coil L1 in the period of Step 1 and in the periods other than Step 1.

$$\text{Duty} \times (Vc - Vout) = (1 - \text{Duty}) \times Vout \text{Duty} \times Vc = Vout \quad (4)$$

It is assumed that the period in Step 3 is also the same Duty as the Duty in the period of Step 1. According to the law of conservation of a magnetic flux change rate for the coil L2, the following equation (5) holds.

$$\text{Duty} \times (Vd - Vout) = (1 - \text{Duty}) \times Vout \text{Duty} \times Vd = Vout \quad (5)$$

From the above equations (4) and (5), the following equation (6) is obtained.

$$Vc = Vd \quad (6)$$

The following equation (7) is obtained from the above equations (1) to (3) and (6).

$$Vin = 5 \times Vc \quad (7)$$

The following equation (8) is obtained from the above equations (4) and (7).

$$\text{Duty} = 5 \times (Vout/Vin) \quad (8)$$

It is seen from the above equation (8) that the Duty of the embodiment is 5 times as long as Dutya in the above comparative example. In other words, when the same relationship between the input voltage Vin and the output voltage Vout as the relationship in the comparative example is obtained, the embodiment can make the switch on-time 5 times as long as the switch on-time in the comparative example. Therefore, it is possible to reduce switching loss and obtain a DCDC circuit with high efficiency.

Note that when used in actual practice, the control circuit 2 may adjust the on-time (duty ratio) of the control signal φ so that the current output voltage Vout matches the target output voltage Vout.

Note that in FIG. 1, the node N4 is connected to the reference potential point via the two switches S2p_3 and S1n. Moreover, the node N4 is connected to the node N2 via the two switches S1p_3 and S1P_2. Therefore, compared to the case where the node N4 is connected to the reference potential point or the node N2 by one switch, it is possible to reduce withstand voltages of the switches S2p_3 and S1p_3.

Thus, in the embodiment, the input voltage is supplied to the coils via the capacitor network, and it is possible to make the switch on-time to obtain necessary output longer than when the input voltage is supplied to the coils via the switch. This makes it possible to alleviate switching loss and obtain a DCDC circuit with high efficiency.

Second Embodiment

Figure 7:
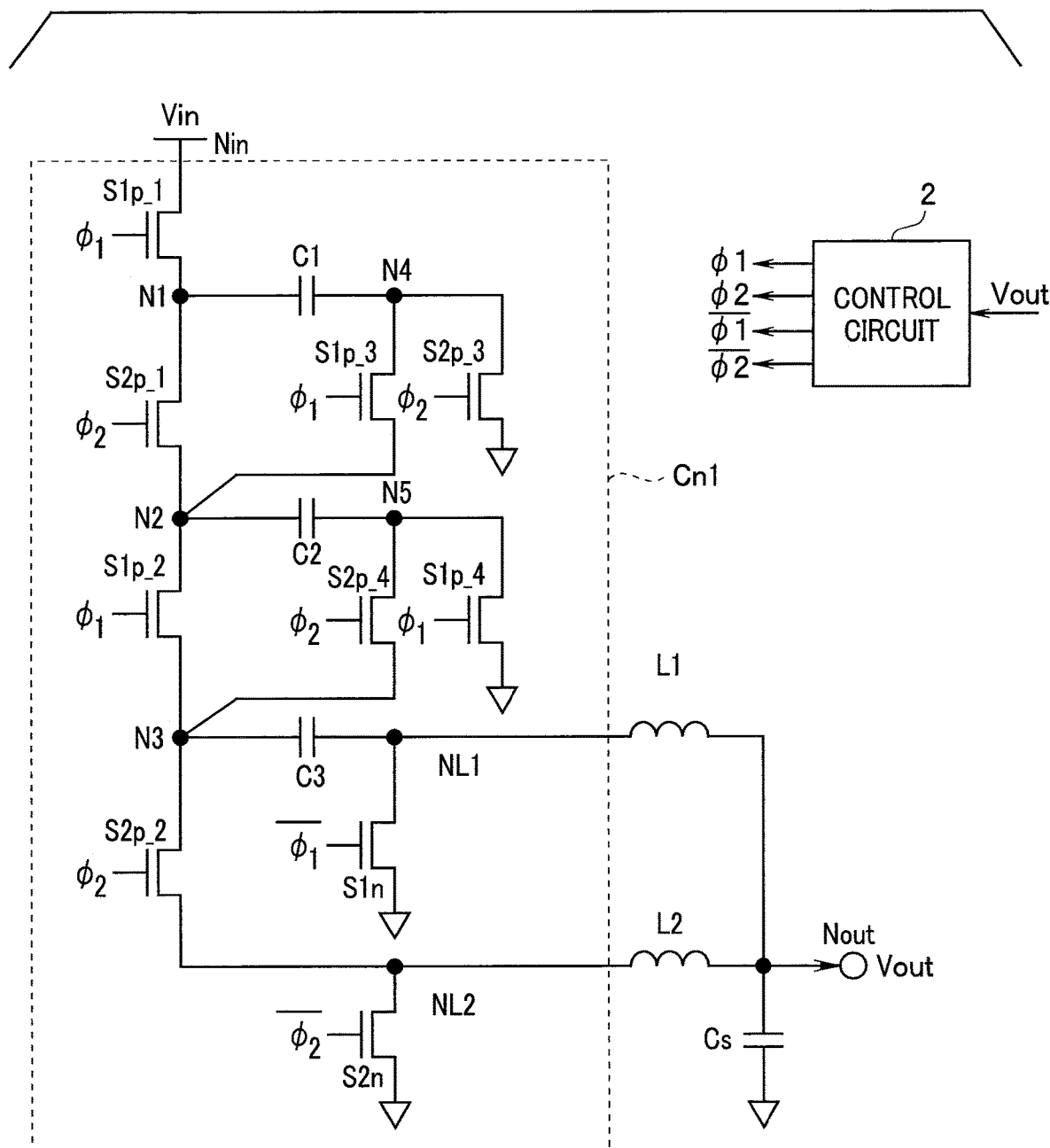
FIG. 7 is a circuit diagram illustrating a second embodiment of the invention.

FIG. 7 is a circuit diagram illustrating a second embodiment of the invention. In FIG. 7, components identical to the components in FIG. 1 are given identical reference numerals and descriptions are omitted.

In the embodiment, a capacitor network Cn1 is adopted. The capacitor network Cn1 is different from the capacitor network Cn in FIG. 1 in that switches S1p_4 and S2p_4 are added and the connection destinations of the switches S1p_3 and S2p_3 are changed.

The switches S1p_1, S1p_2, S1p_3 and S1p_4 (hereinafter referred to as a "switch S1p" when these switches are not distinguished from each other), are turned on/off by the control signal φ1 and the switches S2p_1, S2p_2, S2p_3 and S2p_4 (hereinafter referred to as a "switch S2p" when these switches are not distinguished from each other), are turned on/off by the control signal φ2. The switches S1p, S2p, S1n and S2n are collectively referred to as a "switch S." As the switch S, various switches such as an NMOS transistor, a PMOS transistor or a GaN (nitride gallium) transistor can be adopted.

The node N4 is connected to a reference potential point via the switch S2p_3 and connected to the node N2 via the switch S1p_3. The node N2 is connected to the reference potential point via the capacitor C2 and the switch S1p_4. A connection point (hereinafter referred to as a "node N5") between the capacitor C2 and the switch S1p_4 is connected to the node N3 via the switch S2p_4.

The control of each switch S by the control circuit 2 in the embodiment configured in this way is also similar to the control according to the first embodiment. In other words, the control circuit 2 gives the control signal φ shown in FIG. 2 to each switch S and controls on/off. In Step 1, the switches S1p and S2n turn on. In Step 2, the switches S1n and S2n turn on. In Step 3, the switches S2p_and S1n turn on. In Step 4, the switches S1n and S2n turn on.

In other words, in Step 1, the node Nin is connected to the nodes N2 to N4 via the capacitor C1 and is further connected to one end (node NL1) of the coil L1 via the capacitor C3. In other words, of the capacitor network Cn1, the capacitors C1 and C3 with odd numbers are connected in series between the node Nin and the node NL1. One end of the capacitor C2 with an even number is connected to the node N2, which is a mutual connection point of the capacitors C1 and C3, and the other end of the capacitor C2 is connected to the reference potential point via the switch S1p_4. Note that the node NL2 connected to the coil L2 is connected to the reference potential point. In other words, the connection state is the same as the connection state in the upper left column of FIG. 4.

In Step 2, the node NL1 connected to one end of the coil L1 and the node NL2 connected to one end of the coil L2 are both connected to the reference potential points. In other words, the same connection state in the upper right column of FIG. 4 is provided.

In Step 3, the node N1 or N2 is connected to one end of the coil L2 via the capacitor C2 and via the node N5, N3 or NL2. In other words, of the capacitor network Cn1, the capacitor C2 with an even number is connected in series between the node N1, N2 and the node NL2. The capacitor C1 with an odd number is connected between the node N1, N2 and the reference potential point, and the capacitor C3 with an odd number is connected between the node N2, N3, NL2 and the reference potential point. Note that the node NL1 connected to the coil L1 is connected to the reference potential point. In other words, the same connection state in the lower right column of FIG. 4 is provided.

In Step 4, the node NL1 connected to one end of the coil L1 and the node NL2 connected to one end of the coil L2 are both connected to the reference potential points. In other words, the same connection state in the lower left column of FIG. 4 is provided.

In other words, the connection states in Steps 1 to 4 in the embodiment are the same as the connection state in the first embodiment. Therefore, a relationship of the output voltage Vout to the input voltage Vin is given by the above equation (8) in the embodiment as well. In other words, it is possible to make the switch on-time to obtain necessary output longer than in the comparative example. This makes it possible to alleviate switching loss and obtain a DCDC circuit with high efficiency.

Thus, the embodiment can also obtain effects similar to the effects in the first embodiment.

Third Embodiment

Figure 8:
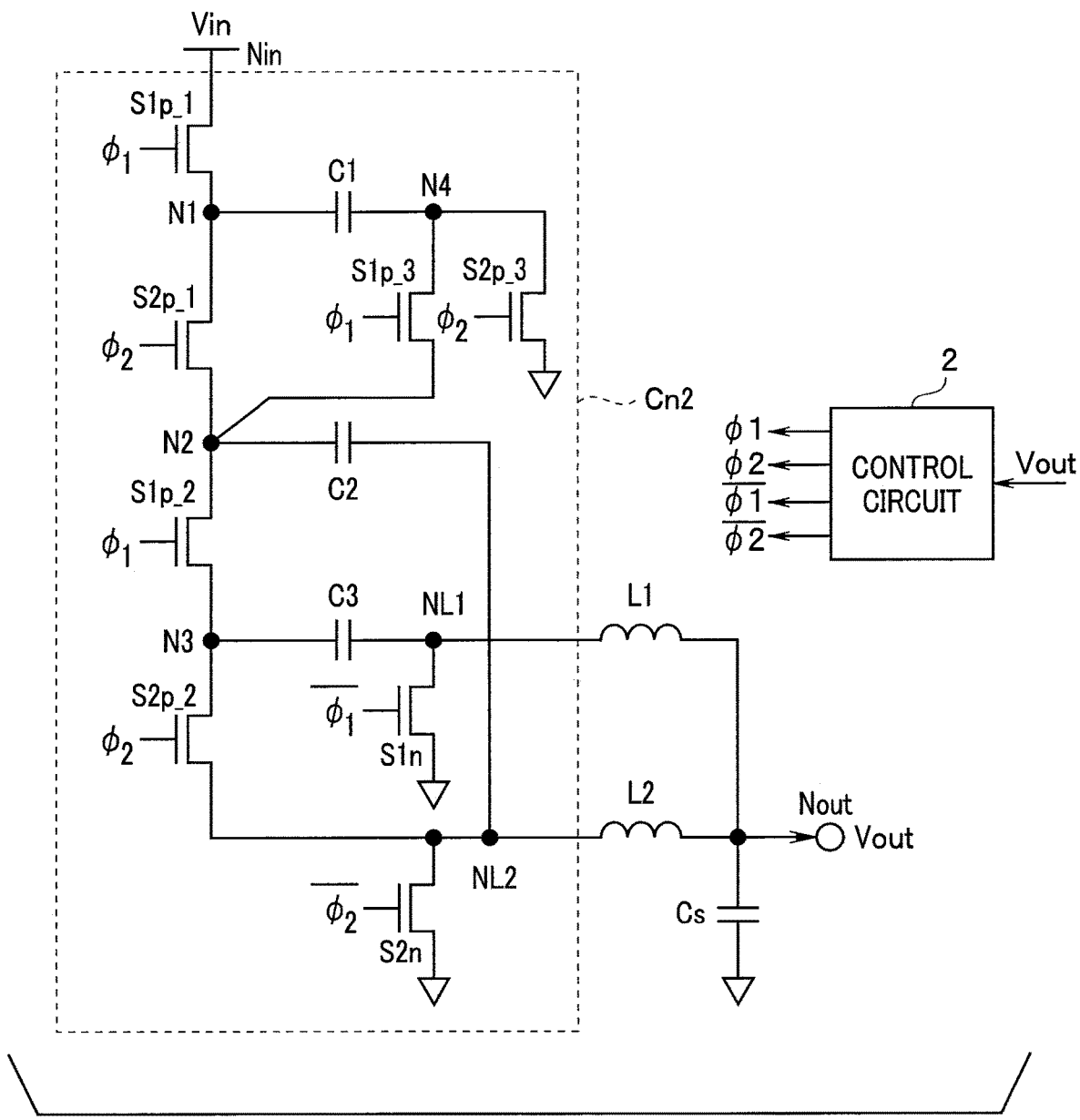
FIG. 8 is a circuit diagram illustrating a third embodiment of the invention.

FIG. 8 is a circuit diagram illustrating a third embodiment of the invention. In FIG. 8, components identical to the components in FIG. 1 are given identical reference numerals and descriptions are omitted.

In the embodiment, a capacitor network Cn2 is adopted. The capacitor network Cn2 is different from the capacitor network Cn in FIG. 1 in that the capacitor network Cn2 is configured to connect the node N4 and the node N2 by the switch S1p_3 instead of connecting between the node N4 and the node N3 by the switch S1p_3, and connect the node N4 to a reference potential point via the switch S2p_3 instead of connecting the node N4 to the node NL1 via the switch S2p_3.

The control on each switch S by the control circuit 2 in the embodiment configured in this way is similar to the control in the first embodiment. In other words, the control circuit 2 gives the control signal φ shown in FIG. 2 to each switch S and controls on/off. In Step 1, the switches S1p and S2n turn on. In Step 2, the switches S1n and S2n turn on. In Step 3, the switches S2p_and S1n turn on. In Step 4, the switches S1n and S2n turn on.

In other words, in Step 1, the node Nin is connected to the nodes N2 to N4 via the capacitor C1 and is further connected to one end (node NL1) of the coil L1 via the capacitor C3. In other words, of the capacitor network Cn2, the capacitors C1 and C3 with odd numbers are connected in series between the node Nin and the node NL1. One end of the capacitor C2 with an even number is connected to the nodes N2 to N4, which is a mutual connection point of the capacitors C1 and C3, and the other end of the capacitor C2 is connected to the reference potential point via the switch S2n. Note that the node NL2 connected to the coil L2 is connected to the reference potential point. In other words, the same connection state in the upper left column of FIG. 4 is provided.

In Step 2, the node NL1 connected to one end of the coil L1 and the node NL2 connected to one end of the coil L2 are both connected to the reference potential points. In other words, the same connection state in the upper right column of FIG. 4 is provided.

In Step 3, the node N1 or N2 is connected to one end of the coil L2 via the capacitor C2 and via the node NL2. In other words, of the capacitor network Cn2, the capacitor C2 with an even number is connected in series between the node N1 or N2 and the node NL2. The capacitor C1 with an odd number is connected between the node N1 or N2 and the reference potential point, and the capacitor C3 with an odd number is connected between the node N3 or NL2 and the reference potential point. Note that the node NL1 connected to the coil L1 is connected to the reference potential point. In other words, the same connection state in the lower right column of FIG. 4 is provided.

In Step 4, the node NL1 connected to one end of the coil L1 and the node NL2 connected to one end of the coil L2 are both connected to the reference potential points. In other words, the same connection state in the lower left column of FIG. 4 is provided.

In other words, the connection states in Steps 1 to 4 in the embodiment are the same as the connection states in the first embodiment. Therefore, a relationship of the output voltage Vout to the input voltage Vin is also given by the above equation (8) in the embodiment. In other words, it is possible to make the switch on-time to obtain necessary output longer than in the comparative example. This makes it possible to alleviate switching loss and obtain a DCDC circuit with high efficiency.

Thus, the embodiment can also obtain effects similar to the effects in the first embodiment.

Fourth Embodiment

Figure 9:
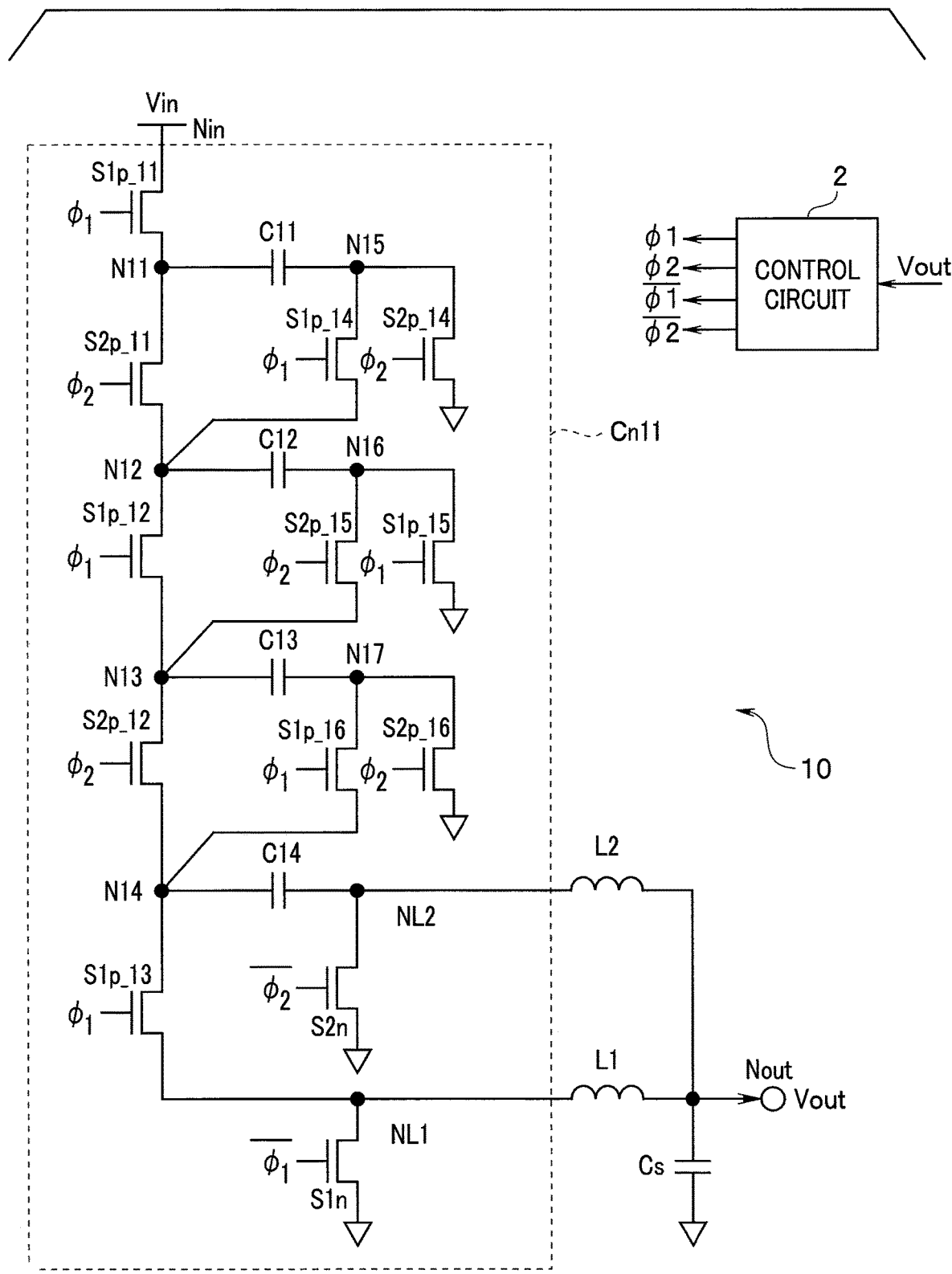
FIG. 9 is a circuit diagram illustrating a fourth embodiment of the invention.

FIG. 9 is a circuit diagram illustrating a fourth embodiment of the invention. In FIG. 9, components identical to the components in FIG. 1 are given identical reference numerals and descriptions are omitted.

As shown in FIG. 9, a DCDC circuit 10 includes a capacitor network Cn11 including four capacitors C11, C12, C13 and C14, two coils L1 and L2 and a capacitor Cs that constitutes a smoothing circuit together with the coils L1 and L2. Moreover, the capacitor network Cn11 includes, to change the connection relationship among the capacitors C11 to C14 and the coils L1 and L2, switches S1p_11 to S1p_16 (hereinafter referred to as "switch S1p" when these switches are not distinguished from each other), switches S2p_11 to S2p_16 (hereinafter referred to as "switch S2p"

when these switches are not distinguished from each other), and switches S1n and S2n. Hereinafter, the switches S1p, S2p, S1n and S2n are collectively referred to as "switch S."

The switch S1p_turns on/off based on the control signal φ1 and the switch S2p turns on/off based on the control signal φ2. The switch S1n turns on/off based on the control signal /φ1 inverted from the control signal φ1, the switch S2n turns on/off based on the control signal /φ2 inverted from the control signal φ2. Note that as the switch S, various switches such as an NMOS transistor, a PMOS transistor, a GaN (nitride gallium) transistor can be adopted.

The DCDC circuit 10 is controlled by the control circuit 2. The control circuit 2 is configured to generate the control signal gyp, supply the generated control signal φ to each switch S and control on/off of each switch S.

The switches S1p_11, S2p_11, S1p_12, S2p_12 and S1p_13 are connected in series between the node Nin to which the input voltage Vin is supplied and the node (node NL1) connected to one end of the coil L1. A connection point of the switch Sip 11 and the switch S2p_11 is referred to as a "node N11," a connection point of the switch S2p_11 and the switch Sip 12 is referred to as a "node N12," a connection point of the switch S1p_12 and the switch S2p_12 is referred to as a "node N13," and a connection point of the switch S2p_12 and the switch Sip 13 is referred to as a "node N14."

The node N11 is connected to the node N12 via the capacitor C11 and the switch Sip 14. A connection point (hereinafter referred to as a "node N15") between the capacitor C11 and the switch Sip 14 is connected to a reference potential point via the switch S2p_14.

The node N12 is connected to the node N13 via the capacitor C12 and the switch S2p_15. A connection point (hereinafter referred to as a "node N16") between the capacitor C12 and the switch S2p_15 is connected to the reference potential point via the switch S1p_15.

The node N13 is connected to the node N14 via the capacitor C13 and the switch Sip 16. A connection point (hereinafter referred to as a "node N17") between the capacitor C13 and the switch Sip 16 is connected to the reference potential point via the switch S2p_16.

The node N14 is connected to the node (node NL2) connected to one end of the coil L2 via the capacitor C14 and the node NL2 is connected to the reference potential point via the switch S2n.

The node NL1 is connected to the reference potential point via the switch S1n. The other end of the coil L1 and the other end of the coil L2 are commonly connected and connected to the node that outputs the output voltage Vout (hereinafter referred to as a "node Nout") and connected to the reference potential point via the capacitor Cs.

(Connection State in Each Step)

Figure 10:
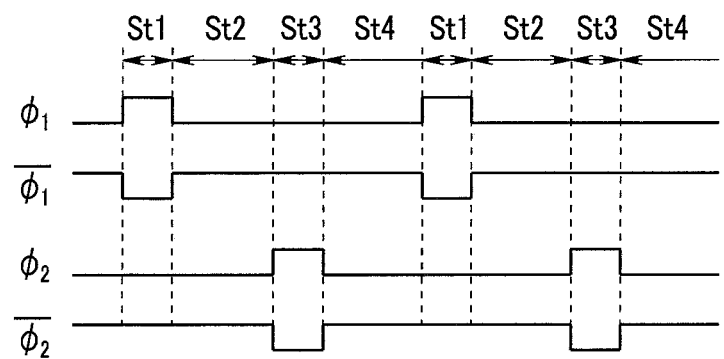
FIG. 10 is a timing chart to describe control signals $\varphi1$, $\varphi2$, $/\varphi1$ and $/\varphi2$.

FIG. 10 is a timing chart to describe control signals φ1, φ2, /φ1 and /φ2.

It is assumed in the embodiment that each switch S turns on at H level of the control signal φ and turns off at L level of the control signal cp. In the embodiment, the control circuit 2 sets four Steps (Step 1 to Step 4) by the control signal cp. St1 to St4 in FIG. 10 represent periods of four Step 1 to Step 4, respectively. The control signal φ1 is at H level in the period St1 and at L level in the other periods. The control signal /φ1 is at L level in the period St1 and at H level in the other periods. The control signal φ2 is at H level in the period St3 and at L level in the other periods. The control signal /φ2 is at L level in the period St3 and at H level in the other periods.

Therefore, in the embodiment, the switches S1p and S2n are on and the switches S2p_and S1n are off in the period St1 of Step 1. The switches S1n and S2n are on and the switches S1p and S2p_are off in the period St2 of Step 2. The switches S2p_and S1n are on and the switches S1p and S2n are off in the period St3 of Step 3. The switches S1n and S2n are on and the switches S1p and S2p_are off in the period St4 of Step 4.

Figure 11:
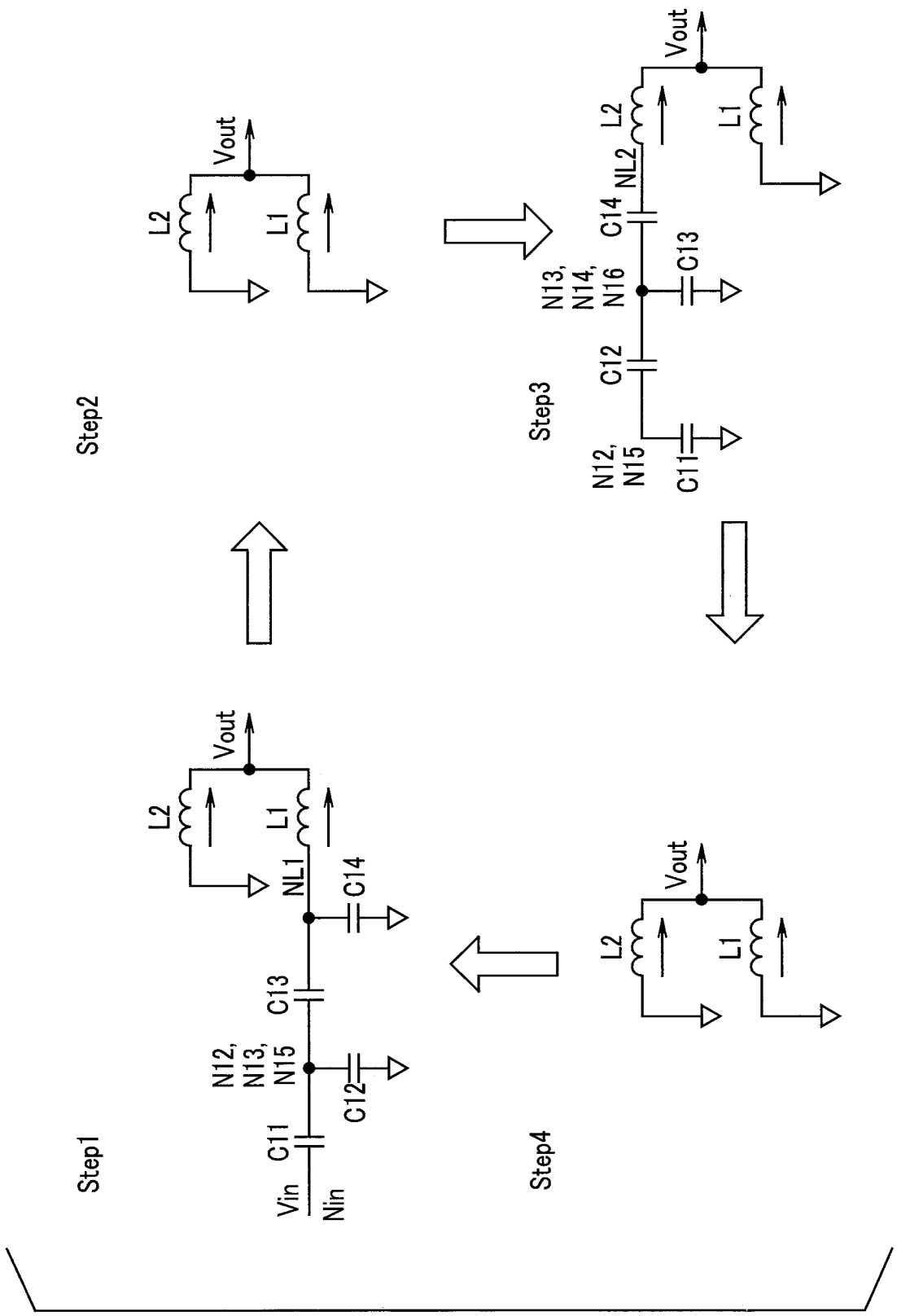
FIG. 11 is an explanatory diagram to describe connection relationships among capacitors C11 to C14 of a capacitor network Cn11 and coils L1 and L2 in Step 1 to Step 4, with a switch S omitted.

FIG. 11 is an explanatory diagram to describe connection relationships among the capacitors C11 to C14 of the capacitor network Cn11, and the coils L1 and L2 in Step 1 to Step 4, with the switch S omitted.

In Step 1, the switches S1p and S2n turn on. Thus, the node Nin is connected to the capacitors C12 and C13 via the capacitor C11 and from the node N15 via the nodes N12 and N13. The capacitor C12 is connected to the reference potential point via the switch S1p_15. Furthermore, the capacitor C13 is connected to the capacitor C14 via the nodes N17 and N14 and is connected to one end of the coil L1 via the node NL1. The capacitor C14 is connected to the reference potential point via the switch S2n. In other words, as shown in an upper left column of FIG. 11, the capacitors C11 and C13 with odd numbers are connected between the node Nin and the node NL1 connected to the coil L1, and the capacitors C12 and C14 with even numbers are connected between both ends of the capacitor C13 and the reference potential points, respectively.

In Step 2, the switches S1n and S2n turn on. Thus, as shown in an upper right column of FIG. 11, the node NL1 connected to one end of the coil L1 and the node NL2 connected to one end of the coil L2 are both connected to the reference potential points.

In Step 3, the switches S2p_and S1n turn on. Thus, one end of the capacitor C11 is connected to the capacitor C12 via the nodes N11 and N12. The other end of the capacitor C11 is connected to the reference potential point via the switch S2p_14. The capacitor C12 is connected to the capacitor C13 via the nodes N16 and N13, and the capacitor C13 is connected to the reference potential point via the switch S2p_16. The node N13 is connected to one end of the capacitor C14 via the node N14 and the other end of the capacitor C14 is connected to one end of the coil L2 via the node NL2. One end of the coil L1 is connected to the reference potential point via the switch S1n. In other words, as shown in a lower right column of FIG. 11, the capacitors C12 and C14 with even numbers are connected between the node N12 or N15 and the node NL2 connected to the coil L2, and the capacitors C11 and C13 are connected between both ends of the capacitor C12 and the reference potential points, respectively.

In Step 4, the switches S1n and S2n turn on. Thus, as shown in a lower left column of FIG. 11, the node NL1 connected to one end of the coil L1 and the node NL2 connected to one end of the coil L2 are both connected to the reference potential points.

(Operation)

Next, operation of the embodiment configured in this way will be described with reference to FIG. 11. Note that arrows in FIG. 11 indicate current directions.

Operations in each Step 1 to Step 4 are similar to the operations of the first embodiment. The embodiment is different from the first embodiment in that the on-time necessary to obtain the output voltage Vout with respect to the input voltage Vin is different. In other words, if it is assumed that a cycle of Step 1 to Step 4 is 1, and the period of Step 1, that is, the period during which the input voltage Vin causes a current to flow through the coils L1 and L2 is Duty2, the Duty2 is expressed by the following equation (9) using the input voltage Vin and the output voltage Vout.

$$Duty2 = 8 \times (Vout/Vin) \quad (9)$$

It is seen from the above equation (9) that the Duty2 of the embodiment is 8 times as long as the Dutya in the above comparative example. In other words, when the same relationship between the input voltage Vin and the output voltage Vout as the relationship in the comparative example is obtained, the embodiment can make the switch on-time 8 times as long as the switch on-time in the comparative example. Therefore, it is possible to alleviate switching loss and obtain a DCDC circuit with high efficiency.

In this way, in the embodiment, the capacitor network in which the two capacitors with odd numbers are connected between the node Nin and the node NL1 connected to the coil L1 and the two capacitors with even numbers are connected between this connection line and the reference potential point makes it possible to step down the input voltage Vin and then apply the voltage to the coil L1. Thus, compared to the case where an input voltage is supplied to a coil via a switch, it is possible to make the switch on-time to obtain necessary output longer. Thus, according to the embodiment, it is also possible to obtain effects similar to the effects in the above embodiments.

Fifth Embodiment

Figure 12:
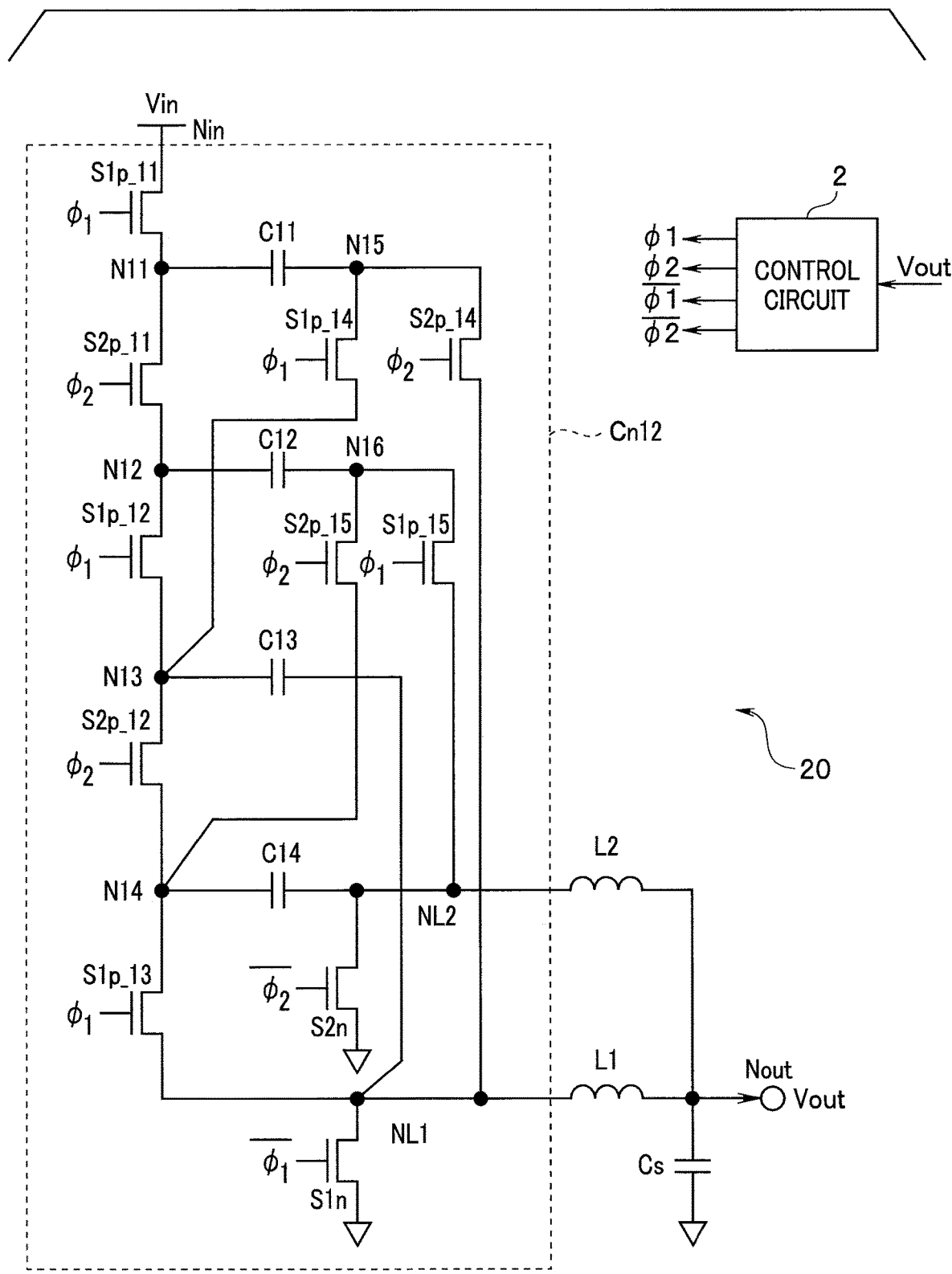
FIG. 12 is a circuit diagram illustrating a fifth embodiment of the invention.

FIG. 12 is a circuit diagram illustrating a fifth embodiment of the invention. In FIG. 12, components identical to the components in FIG. 9 are given identical reference numerals and descriptions are omitted.

As shown in FIG. 12, a DCDC circuit 20 is different from the DCDC circuit 10 in FIG. 9 in that the switches S1p_16 and S2p_16 are omitted, the node N15 is connected to the node NL1 via the switch S2p_14, the node N16 is connected to the node NL2 via the switch S1p_15, the node N16 is connected to the node N14 via the switch S2p_15 and the node N13 is connected to the node NL1 via the capacitor C13.

In Step 1, the switches S1p and S2n turn on. Thus, the node Nin is connected to the capacitors C12 and C13 via the capacitor C11 and from the node N15 via the nodes N12 and N13. The capacitor C12 is connected to a reference potential point via the switches S1p_15 and S2n. The capacitor C13 is connected to the capacitor C14 via the nodes NL1 and N14 and is connected to one end of the coil L1 via the node NL1. The capacitor C14 is connected to the reference potential point via the switch S2n. In other words, in Step 1, as shown an upper left column of FIG. 11, the capacitors C11 and C13 with odd numbers are connected between the node Nin and the node NL1 connected to the coil L1 and the capacitors C12 and C14 with even numbers are connected between both ends of the capacitor C13 and the reference potential point, respectively.

In Step 2, the switches S1n and S2n turn on. In this way, as shown in an upper right column of FIG. 11, the node NL1 connected to one end of the coil L1 and the node NL2 connected to one end of the coil L2 are both connected to the reference potential point.

In Step 3, the switches S2p_and S1n turn on. In this way, one end of the capacitor C11 is connected to the capacitor C12 via the nodes N11 and N12. The other end of the capacitor C11 is connected to the reference potential point via the switches S2p_14 and S1n. The capacitor C12 is connected to one end of the capacitor C13 via the nodes N16, N14 and N13, and the other end of the capacitor C13 is connected to the reference potential point via the switch S1n. The capacitor C13 is connected to the capacitor C14 via the nodes N13 and N14, and the capacitor C14 is connected to one end of the coil L2 via the node NL2. One end of the coil L1 is connected to the reference potential point via the switch S1n. In other words, as shown in a lower right column in FIG. 11, the capacitors C12 and C14 with even numbers are connected between the node N12 or N15 and the node NL2 connected to the coil L2, and the capacitors C11 and C13 are connected between both ends of the capacitor C12 and the reference potential point, respectively.

In Step 4, the switches S1n and S2n turn on. In this way, as shown in the lower left column of FIG. 11, the node NL1 connected to one end of the coil L1 and the node NL2 connected to one end of coil L2 are both connected to the reference potential points.

Thus, the connection states in each Step 1 to Step 4 according to the embodiment are the same as the connection states in FIG. 11. Therefore, the embodiment provides operations and effects similar to the operations and effects according to the fourth embodiment.

Note that the node N15 is connected to the reference potential point via the two switches S2p_14 and S1n, and it is thereby possible to lower a withstand voltage of the switch S2p_14 in comparison with the example in FIG. 9.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A DCDC circuit comprising:
   a capacitor network comprising two or more first capacitors, at least one second capacitor, and a plurality of switches;
   a first coil having one end connected to the capacitor network;
   a second coil having one end connected to the capacitor network; and
   a smoothing capacitor connected between each of another end of the first coil and another end of the second coil and a reference potential point, wherein
   through the plurality of switches, the capacitor network comprises a first state in which the two or more first capacitors are connected onto a wiring path between an input node to which an input voltage is applied and the one end of the first coil and the at least one second capacitor is connected between a connection point of the two or more first capacitors on the wiring path and the reference potential point, and a second state in which the at least one second capacitor is connected to the one end of the second coil and the two or more first capacitors are connected between one end of the at least one second capacitor and the reference potential point and between another end of the at least one second capacitor and the reference potential point, respectively.

2. The DCDC circuit according to claim 1, wherein through the plurality of switches, the capacitor network comprises a third state in which the one end of the first coil and the one end of the second coil are connected to the reference potential point.

3. The DCDC circuit according to claim 2, wherein through the plurality of switches, the capacitor network cyclically repeats the first state, the third state, and the first state and the third state.

4. The DCDC circuit according to claim 1, wherein through the plurality of switches, the capacitor network further connects a second capacitor, which is the at least one second capacitor, between the one end of the first coil and the reference potential point in the first state, and further connects a second capacitor, which is the at least one second capacitor, between the at least one second capacitor and the second coil in the second state.

5. The DCDC circuit according to claim 4, wherein
through the plurality of switches, the capacitor network comprises a third state in which the one end of the first coil and the one end of the second coil are connected to the reference potential point, and
through the plurality of switches, the capacitor network cyclically repeats the first state, the third state, and the first state and the third state.

6. A DCDC circuit comprising:
a capacitor network comprising a first capacitor, a second capacitor, and a third capacitor, and a first switch, a second switch, a third switch, a fourth switch, a fifth switch, a sixth switch, a seventh switch, and an eighth switch;
a first coil having one end connected to the capacitor network;
a second coil having one end connected to the capacitor network; and
a smoothing capacitor connected between each of another end of the first coil and another end of the second coil and a reference potential point, wherein
through the first switch, the second switch, the third switch, the fourth switch, the fifth switch, the sixth switch, the seventh switch, and the eighth switch, the capacitor network comprises a first state in which the first capacitor and the third capacitor are connected onto a wiring path between an input node to which an input voltage is applied and the one end of the first coil, and the second capacitor is connected between a connection point of the first capacitor and the third capacitor on the wiring path and the reference potential point, and a second state in which the second capacitor is connected to the one end of the second coil, the first capacitor is connected between one end of the second capacitor and the reference potential point, and the third capacitor is connected between another end of the second capacitor and the reference potential point.

7. The DCDC circuit according to claim 6, wherein
the first switch, the second switch, the third switch, and the fourth switch are connected between the input node to which the input voltage is applied and a first node, between the first node and a second node, between the second node and a third node, and between the third node and the one end of the second coil, respectively,
the first capacitor is connected between the first node and a fourth node,
the second capacitor is connected between the second node and the one end of the second coil,
the third capacitor is connected between the third node and the one end of the first coil,
the fifth switch connects between the fourth node and the third node,
the sixth switch connects between the fourth node and the one end of the first coil,
the seventh switch connects between the first coil and the reference potential point,
the eighth switch connects between the second coil and the reference potential point, and
the first switch, the third switch, and the fifth switch simultaneously turn on/off, the second switch, the fourth switch, and the sixth switch simultaneously turn on/off at timings different from timings of the first switch, the third switch, and the fifth switch, and the seventh switch and the eighth switch turn on/off at mutually different timings.

8. The DCDC circuit according to claim 6, wherein
the capacitor network further comprises a ninth switch and a tenth switch,
the first switch, the second switch, the third switch, and the fourth switch are connected between the input node to which the input voltage is applied and the first node, between the first node and the second node, between the second node and the third node, and between the third node and the one end of the second coil, respectively,
the first capacitor is connected between the first node and a fourth node,
the second capacitor is connected between the second node and a fifth node,
the third capacitor is connected between the third node and the one end of the first coil,
the fifth switch connects between the fourth node and the second node,
the sixth switch connects between the fourth node and the reference potential point,
the seventh switch connects between the fifth node and the reference potential point,
the eighth switch connects between the fifth node and the third node,
the ninth switch connects between the first coil and the reference potential point,
the tenth switch connects between the second coil and the reference potential point,
the first switch, the third switch, the fifth switch, and the seventh switch simultaneously turn on/off, the second switch, the fourth switch, the sixth switch, and the eighth switch simultaneously turn on/off at timings different from timings of the first switch, the third switch, the fifth switch, and the seventh switch, and the ninth switch and the tenth switch turn on/off at mutually different timings.

9. The DCDC circuit according to claim 6, wherein
the first switch, the second switch, the third switch, and the fourth switch are connected between the input node to which the input voltage is applied and a first node, between the first node and a second node, between the second node and a third node, and between the third node and the one end of the second coil, respectively,
the first capacitor is connected between the first node and a fourth node,
the second capacitor is connected between the second node and the one end of the second coil,
the third capacitor is connected between the third node and the one end of the first coil,
the fifth switch connects between the fourth node and the second node,
the sixth switch connects between the fourth node and the reference potential point, the seventh switch connects between the first coil and the reference potential point, the eighth switch connects between the second coil and the reference potential point, and the first switch, the third switch, and the fifth switch simultaneously turn on/off, the second switch, the fourth switch and, the sixth switch simultaneously turn on/off at timings different from timings of the first switch, the third switch, and the fifth switch, and the seventh switch and the eighth switch turn on/off at mutually different timings.

10. A DCDC circuit comprising:

a capacitor network comprising a first capacitor, a second capacitor, a third capacitor, and a fourth capacitor, and a first switch, a second switch, a third switch, a fourth switch, a fifth switch, a sixth switch, a seventh switch, an eighth switch, a ninth switch, a tenth switch, and an eleventh switch;

a first coil having one end connected to the capacitor network;

a second coil having one end connected to the capacitor network; and a smoothing capacitor connected between each of another end of the first coil and another end of the second coil and a reference potential point, wherein through the first switch, the second switch, the third switch, the fourth switch, the fifth switch, the six switch, the seventh switch, the eighth switch, the ninth switch, the tenth switch, and the eleventh switch, the capacitor network comprises a first state in which the first capacitor and the third capacitor are connected onto a wiring path between an input node to which an input voltage is applied and the one end of the first coil, the second capacitor is connected between a connection point of the first capacitor and the third capacitor on the wiring path and the reference potential point, and the fourth capacitor is connected between the one end of the second coil and the reference potential point, and a second state in which the fourth capacitor and the second capacitor are connected in series to the one end of the second coil, the first capacitor is connected between one end of the second capacitor and the reference potential point, and the third capacitor is connected between another end of the second capacitor and the reference potential point.

11. The DCDC circuit according to claim 10, wherein the first switch, the second switch, the third switch, the fourth switch, and the fifth switch are connected between the input node to which the input voltage is applied and a first node, between the first node and a second node, between the second node and a third node, between the third node and a fourth node, and between the fourth node and the one end of the first coil, respectively, the first capacitor is connected between the first node and a fifth node, the second capacitor is connected between the second node and a sixth node, the third capacitor is connected between the third node and the one end of the first coil, the fourth capacitor is connected between the fourth node and the one end of the second coil, the sixth switch connects between the fifth node and the one end of the first coil, the seventh switch connects between the fifth node and the second node, the eighth switch connects between the sixth node and the fourth node, the ninth switch connects between the sixth node and the one end of the second coil, the tenth switch connects between the first coil and the reference potential point, the eleventh switch connects between the second coil and the reference potential point, and the first switch, the third switch, the fifth switch, the seventh switch, and the ninth switch simultaneously turn on/off, the second switch, the fourth switch, the sixth switch, and the eighth switch simultaneously turn on/off at timings different from timings of the first switch, the third switch, the fifth switch, the seventh switch, and the ninth switch, and the tenth switch and the eleventh switch turn on/off at mutually different timings.

12. The DCDC circuit according to claim 10, wherein the capacitor network further comprises a twelfth switch and a thirteenth switch, the first switch, the second switch, the third switch, the fourth switch, and the fifth switch are connected between the input node to which the input voltage is applied and a first node, between the first node and a second node, between the second node and a third node, between the third node and a fourth node, and between the fourth node and the one end of the first coil, respectively, the first capacitor is connected between the first node and a fifth node, the second capacitor is connected between the second node and a sixth node, the third capacitor is connected between the third node and a seventh node, the fourth capacitor is connected between the fourth node and the one end of the second coil, the sixth switch connects between the fifth node and the reference potential point, the seventh switch connects between the fifth node and the second node, the eighth switch connects between the sixth node and the third node, the ninth switch connects between the sixth node and the reference potential point, the tenth switch connects between the seventh node and the reference potential point, the eleventh switch connects between the seventh node and the fourth node, the twelfth switch connects between the first coil and the reference potential point, the thirteenth switch connects between the second coil and the reference potential point, and the first switch, the third switch, the fifth switch, the seventh switch, the ninth switch, and the eleventh switch simultaneously turn on/off, the second switch, the fourth switch, the sixth switch, the eighth switch, and the tenth switch simultaneously turn on/off at timings different from timings of the first switch, the third switch, the fifth switch, the seventh switch, the ninth switch, and the eleventh switch, and the twelfth switch and the thirteenth switch turn on/off at mutually different timings.

* * * * *